(12) United States Patent
Yin

(10) Patent No.: US 7,065,390 B2
(45) Date of Patent: Jun. 20, 2006

(54) LOW COST POWER BACK-UP SYSTEM FOR CORDLESS TELEPHONE SYSTEM

(75) Inventor: Hoey Ng Ho Yin, Hong Kong (HK)

(73) Assignee: VTech Telecommunications Limited, Tai Po (HK)

(*) Notice: Subject to any disclaimer, the term of this patent is extended or adjusted under 35 U.S.C. 154(b) by 221 days.

(21) Appl. No.: 10/706,976

(22) Filed: Nov. 14, 2003

(65) Prior Publication Data
US 2005/0107133 A1    May 19, 2005

(51) Int. Cl.
*H04M 1/00*    (2006.01)
(52) U.S. Cl. .................. 455/572; 455/573; 455/343.6
(58) Field of Classification Search ............... 455/572, 455/573, 575, 550.1, 343, 74.1, 127, 575.1, 455/343.6, 127.1; 379/324, 395.01, 322, 379/323
See application file for complete search history.

(56) References Cited

U.S. PATENT DOCUMENTS

| | | | |
|---|---|---|---|
| 5,578,875 A | | 11/1996 | Dormer et al. |
| 5,596,626 A | * | 1/1997 | Nakayama ................ 455/462 |
| 5,661,780 A | * | 8/1997 | Yamamoto et al. ......... 455/573 |
| 5,805,998 A | * | 9/1998 | Kodama .................... 455/462 |
| 6,044,280 A | | 3/2000 | Mueller |
| 6,668,178 B1 | * | 12/2003 | Ramaswamy et al. ...... 455/572 |
| 6,757,549 B1 | * | 6/2004 | Riedl ........................ 455/522 |
| 6,862,464 B1 | * | 3/2005 | Son ........................... 455/572 |

FOREIGN PATENT DOCUMENTS

| | | |
|---|---|---|
| EP | 0935377 A2 | 11/1999 |
| GB | 9311313.2 | 11/1995 |
| WO | WO 99/31860 A1 | 6/1999 |
| WO | WO 01/13490 A1 | 2/2001 |

* cited by examiner

*Primary Examiner*—Sonny Trinh
(74) *Attorney, Agent, or Firm*—Pillsbury Winthrop Shaw Pittman LLP

(57) ABSTRACT

A method and system for powering of an electronic apparatus having a base unit and one or more portable units is disclosed. The electronic apparatus can be, for example, a cordless telephone system that includes a base unit and a portable unit. The base unit is normally powered by an external power supply. Each portable unit includes a battery pack, preferably a rechargeable battery pack. The portable unit can be placed into a cradle in the base unit. Preferably, the battery pack of the portable unit can be recharged when power is present from the external power supply. Upon failure of the external power supply, the base unit receives power from the battery pack of the portable unit. Thus, the electronic apparatus remains operational even during the power failure. In the context of a cordless telephone, the base unit can be operational during the power failure via a speakerphone operation or additional portable units that are capable of communication with the base unit.

25 Claims, 3 Drawing Sheets

LOW COST POWER BACK-UP SYSTEM FOR CORDLESS TELEPHONE SYSTEM

BACKGROUND

1. Field of Invention

This invention relates generally to wireless communications. In particular, the invention relates to systems and methods for providing electrical power by a portable unit to a base unit.

2. Background Art

Devices enabling wireless communications are becoming increasingly popular. One example of this trend is cordless telephony. Cordless telephones have largely replaced conventional corded telephones in many homes by providing enhanced features and flexibility in conducting telephonic communications.

Unlike conventional consumer corded telephones, which typically operate solely from power supplied by the public switched telephone network (PSTN), cordless telephones typically require an external power source to enable their operation. Specifically, such telephones are typically supplied with a DC power adapter which must be connected to a wall power outlet. The increased amount of power that can be supplied via the power outlet, compared to the public switched telephone network, enables operation of the base unit transmitter and receiver circuits required for cordless operation, as well as other advanced features such as integrated answering machines and/or base unit speakerphones.

However, the requirement for an external power source can be disadvantageous in the event of a power outage because many cordless telephone systems become inoperable. A power outage may be especially problematic because power outages often occur during emergencies such as severe weather, or other situations during which a person may wish to call for help. Because cordless telephones are so popular, many people do not even own a conventional corded telephone and thus they will be completely unable to make or receive telephone calls in power outage circumstances. Even those who retain an old corded telephone in storage will be forced to find and connect the corded telephone before any calls can be made. Finding and connecting a stored corded telephone may be particularly difficult during a power outage without lights.

Recently, multi-handset cordless telephone systems have become popular among consumers. Such systems typically include a single base unit capable of communicating with multiple cordless handsets, each handset being powered by its own rechargeable battery. Each cordless handset then requires only a charging base to maintain the battery level in the handset. In such systems, handsets can be positioned in any area within the home or office at which a power outlet is available, thereby providing increased flexibility compared to conventional single-handset models that also require a telephone line connection for each handset. Furthermore, the handset charging base is typically substantially smaller and more aesthetically pleasing than a conventional cordless telephone base unit. However, as with conventional cordless telephones, most multi-handset cordless telephone systems are also disabled if the wall outlet power supply to the base unit fails.

One solution to the problems of power outages is to provide a backup battery within the cordless telephone base unit. Such a system is described in U.S. Pat. No. 5,578,875, assigned to VTech Communications, Ltd. When a power outage occurs, the base unit switches its power input from the line input to the backup battery resident in the base unit. Accordingly, the base unit remains operational and available to make and receive telephone calls until the base unit backup battery is depleted.

However, a battery pack is typically a costly component of a cordless telephone system. Providing an extra base unit battery pack with each cordless telephone system adds substantially to the cost of the telephone, placing such a telephone at a competitive disadvantage. While the base unit battery pack can be sold separately, consumers desiring the backup power supply feature are still burdened with the added cost of purchasing the second battery. Moreover, many consumers opt not to incur the substantial cost of a base battery pack due to the perceived rarity of circumstances in which such a battery pack would be required. Such consumers are then severely inconvenienced when their power inevitably does fail.

Therefore, it would be highly desirable to enable operation of a cordless telephone system during a power outage with minimal extra cost. This and other objects of the invention will become apparent in view of the disclosure herein.

SUMMARY OF THE INVENTION

Systems and methods of the invention relate to provision of power by a portable unit to a base unit of an electrical apparatus. An exemplary system of the invention is a cordless telephone system. The system includes a base unit normally powered by an external power supply, and at least one portable unit. The portable unit is powered by an internal battery pack. The battery pack is preferably a rechargeable battery pack. The base unit includes a cradle configured to support the portable unit. The cradle includes electrical terminals which are positioned to contact corresponding charging terminals of the portable unit while the portable unit is positioned within the cradle. When power from the external power supply is present at the base unit, the base unit provides power to the cradle terminals to enable charging of the battery of the portable unit.

The base unit is capable of detecting a power outage condition. Upon detection of a power outage condition, the portable unit charging circuit is deactivated. A mode power control circuit within the base unit is switched to couple the cradle electrical terminals to a base unit voltage regulator circuit. Thus, the portable unit battery pack supplies power through the charging terminals and the mode power control circuit to the base unit voltage regulator circuit. The voltage regulator circuit then distributes power to the various other circuits within the base unit.

By powering the base unit with the battery of a portable unit disposed within the cradle during a power outage condition, the base unit remains operational. In the context of a cordless telephone system, calls can be placed or received via, for example, a second cordless portable unit, a speakerphone integrated into the base unit, or a speakerphone integrated into the portable unit providing the source of power that is positioned on the cradle.

In accordance with one embodiment, the present invention provides an electronic apparatus that includes a portable unit having a battery pack and charge terminals that are electrically coupled to the battery pack and at least one portable unit. The base unit includes a voltage status control circuit for detecting and determining a voltage level of a power supply of the base unit, and a cradle disposed within the base unit for receiving the portable unit. The cradle has electrical contacts positioned for electrical coupling with the charge terminals of the portable unit when the portable unit is disposed within the cradle. Furthermore, the base unit operates using power received from the battery pack of the portable unit when the voltage level of the base unit power supply is below a predetermined level.

In accordance with a second embodiment, the present invention provides a method for powering a base unit of an electronic apparatus that includes detecting by the base unit that a power outage condition has occurred, placing a portable unit of the electronic apparatus into a cradle of the base unit, and receiving power by the base unit from a battery pack of the portable unit when a power outage condition is detected. The method further comparing a voltage level of an external power line to a predetermined voltage level; and receiving power by the base unit from the battery pack of the portable unit when the voltage level of the external power line has fallen below the predetermined voltage level.

In accordance with a third embodiment, the present invention provides a cordless telephone system for continued operation of a base unit during a power outage condition that includes a first cordless telephone portable unit, including a rechargeable battery pack, and charge terminals that are electrically coupled to the rechargeable battery pack, and a base unit capable of communicating with the first cordless portable unit to place and receive telephone calls. The base unit includes a cradle that is configured to receive the first cordless portable unit. The cradle includes electrical contacts for electrical coupling with the portable unit charge terminals when the portable unit is disposed within the cradle. The base unit further includes a power supply for receiving electrical power from an external power source, a line status control circuit coupled to the base unit power supply which outputs a signal indicative of whether the voltage present on the power line exceeds a predefined level, a portable unit charging circuit responsive to an output of the line status control circuit to provide electrical energy to the electrical contacts when the voltage present on the power line exceeds a predefined level; and a power control circuit responsive to an output of the line status control circuit to couple the electrical contacts to an input of a voltage regulator circuit when the voltage present on the power line falls below a predefined level. The base unit operates using power supplied by the first portable unit rechargeable battery pack when the external source of power to the power line fails.

DESCRIPTION OF THE INVENTION

Figure 1:
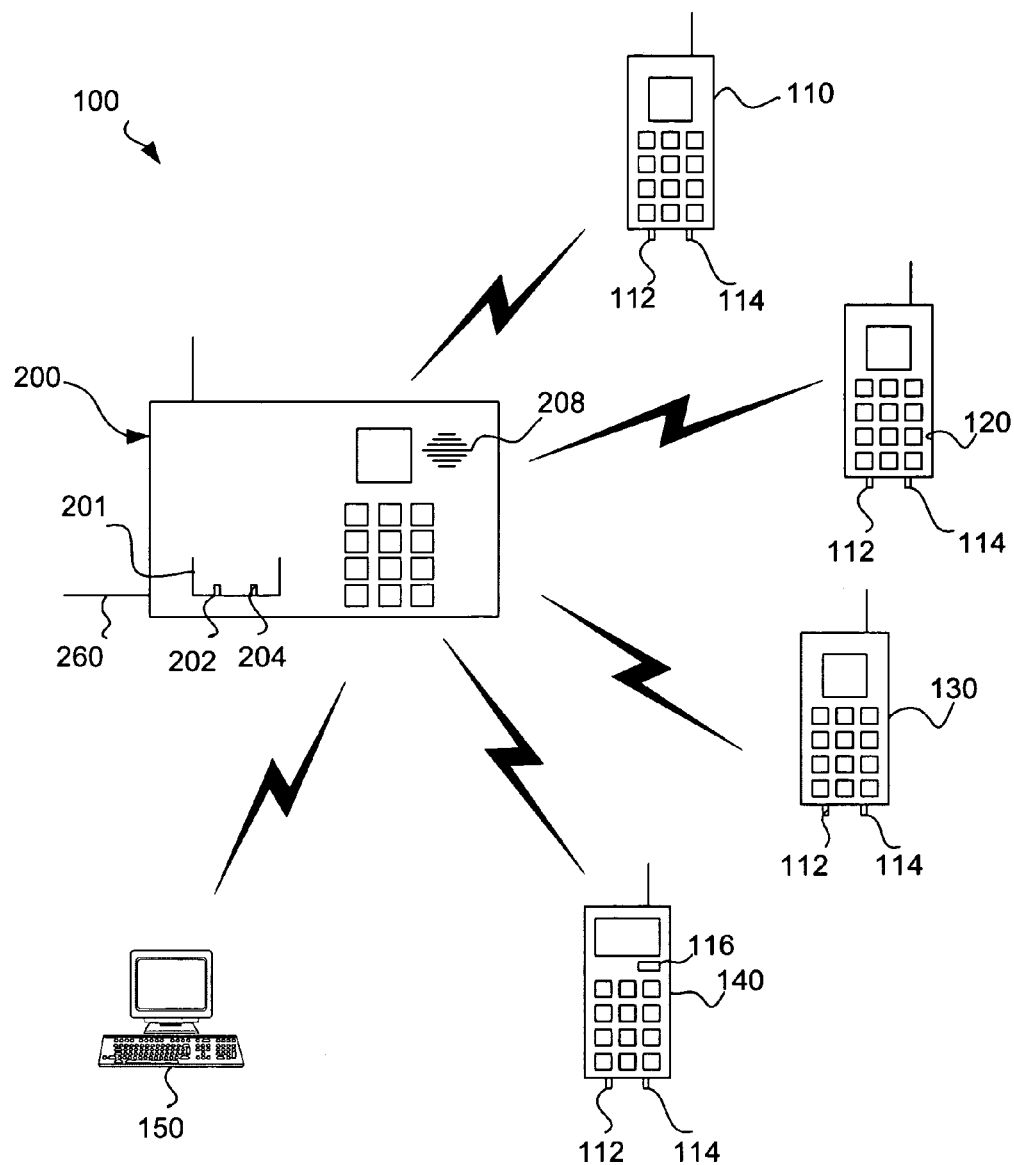
FIG. 1 is a schematic diagram of an exemplary cordless telephone system that includes a plurality of portable units or remote portable units.

While this invention is susceptible to different embodiments in many different forms, there are shown in the drawings and will be described in detail herein specific embodiments. The present disclosure is to be considered as an exemplification of the principle of the invention intended merely to explain and illustrate the invention, and is not intended to limit the invention in any way to embodiments illustrated.

The drawings describe a wireless communication system including an external line-powered base unit and at least one battery-powered portable unit. The base unit is capable of operation in the event of a power failure.

Figure 2:
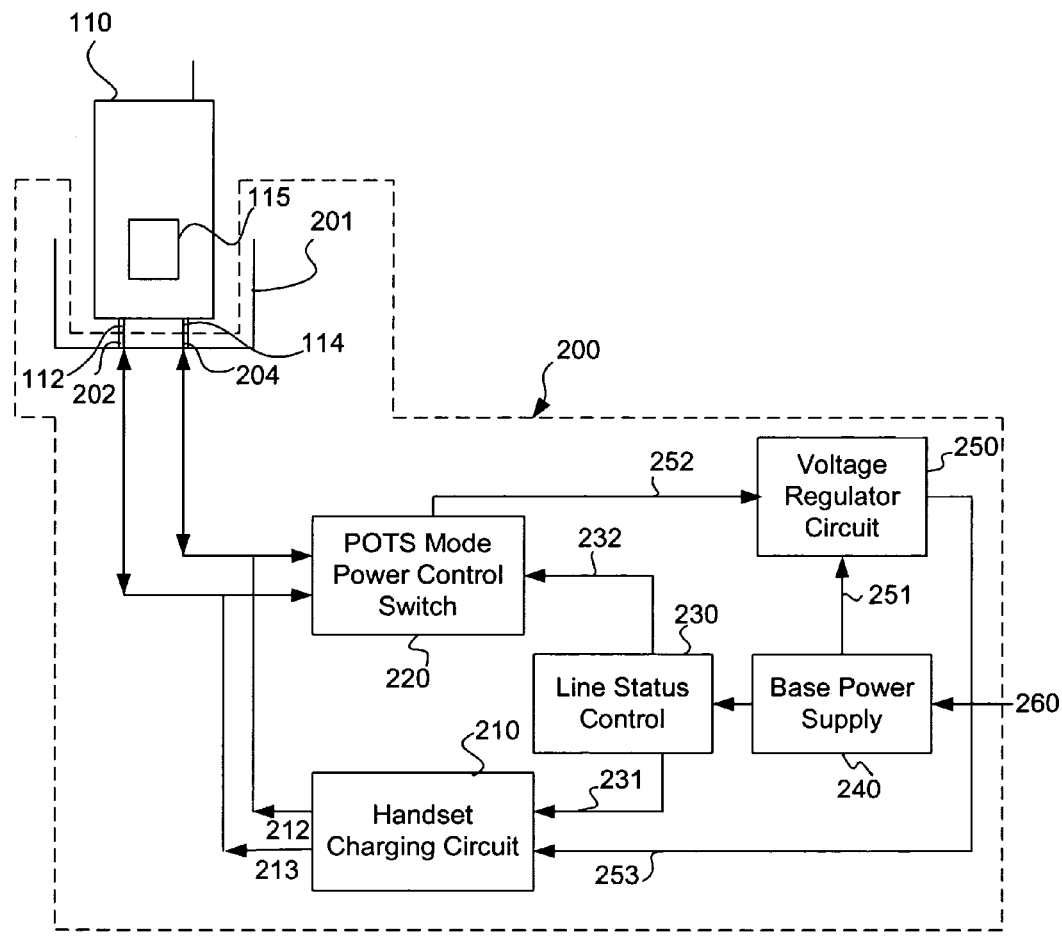
FIG. 2 is a schematic block diagram of an exemplary cordless telephone system capable of continued operation during a power failure.

FIG. 1 illustrates a multi-handset cordless telephone system 100, which includes base unit 200 and one or more portable units 110, 120, 130, and 140. Base unit 200 is capable of cordless communications with any of portable unit 110, 120, 130, and 140. Portable units 110, 120, 130, and 140 are each powered by an internal battery pack (e.g., battery pack 115 as shown in FIG. 2) that is preferably a rechargeable battery pack. Each portable unit has charge terminals 112 and 114 that are electrically coupled with battery pack 115. Base unit 200 can further act as a wireless digital gateway by providing a wireless data link for digital devices including personal computer 150. Base unit 200 receives DC power from power line 260, which is connected to a DC power converter and a conventional AC power outlet (not shown). Base unit 200 includes cradle 201, which includes charge contacts 202 and 204 and is configured to receive one of portable units 110, 120, 130, and 140 towards supporting the portable unit and facilitating the provision of DC power to recharge the battery pack of the portable unit stationed within cradle 201. Charge contacts 202 and 204 are configured to be coupled with charge terminals 112 and 114 of each of portable units 110, 120, 130, and 140 when one of the portable units is placed within cradle 201 of base unit 200 (as schematically depicted in FIG. 2). In an alternative embodiment, each of portable units 110, 120, 130, and 140 can be placed within a separate charging cradle (not shown) that is electrically connected to a power outlet. Base unit 200 may also include speakerphone 208 that allows a user to receive and place telephone calls without using any of portable units 110, 120, 130, and 140. Speakerphone 208 preferably includes a microphone and a speaker (not shown).

FIG. 2 is a schematic block diagram of base unit 200 having portable unit 110 positioned within cradle 201. During normal operation, battery pack 115 of portable unit 110 is recharged via charge contacts 202 and 204. Base unit 200 receives DC power from power line 260. Power is conveyed to base unit power supply 240. Power supply 240 conveys power to voltage regulator circuit 250 via voltage regulator input 251, and to line status control circuit 230. Voltage regulator circuit 250 includes two inputs 251 and 252, and distributes regulated DC power to the circuitry within base unit 200, including portable unit charging circuit 210 via output 253.

The voltage level received by base power supply 240 is also conveyed to line status control circuit 230. Line status control 230 compares the voltage level of base power supply 240 to a pre-defined threshold operating level. When the power supply voltage exceeds the threshold level, a power outage condition is deemed not present. Therefore, the state of control lines 231 and 232 is set to a logic high level. Portable unit charging circuit 210 is activated in response to the logic high level of control line 231. Charging circuit 210 conveys DC power received from regulators 250 to charge contacts 202, 204 and, in turn, portable unit battery 115 via charge terminals 112, 114. Accordingly, portable unit battery 115 is recharged. POTS mode power control switch 220 responds to the logic high level on control line 232 by switching into an open position, thereby disconnecting charge contacts 202, 204 from voltage regulator input 252.

In the event of a power failure at power line 260, the voltage level conveyed by base power supply 240 to line status control circuit 230 drops below the pre-defined threshold level. In response, line status control circuit 230 toggles control lines 231 and 232 into logic low states. Portable unit charging circuit 210 responds to the low state of line 231 by placing charge lines 212 and 214 into high-impedance states, whereby charging circuit 210 neither supplies nor draws substantial current via charge contacts 202, 204.

POTS mode power control switch 220 responds to the logic low state of control line 232 by switching into a closed state, such that charge contacts 202, 204 are connected through power control switch 220 to voltage regulators 250 via regulator circuit input 252. Regulator 250 then begins drawing power from portable unit battery 115 through contacts 202, 204 and power control switch 220.

In this way, base unit 200 remains operational during the failure of power line 260 by drawing power from the battery of a portable unit disposed within the base cradle. Thus, telephone calls can be conducted using any of portable units 120, 130, or 140, or a speakerphone (e.g., speakerphone 208 in FIG. 1.) When battery 115 within portable unit 110 becomes depleted, portable unit 110 can be replaced by placing portable unit 120 within the base unit cradle, such that further continued operation is available. Such use can be continued so long as portable units having battery power remain available.

Figure 3:
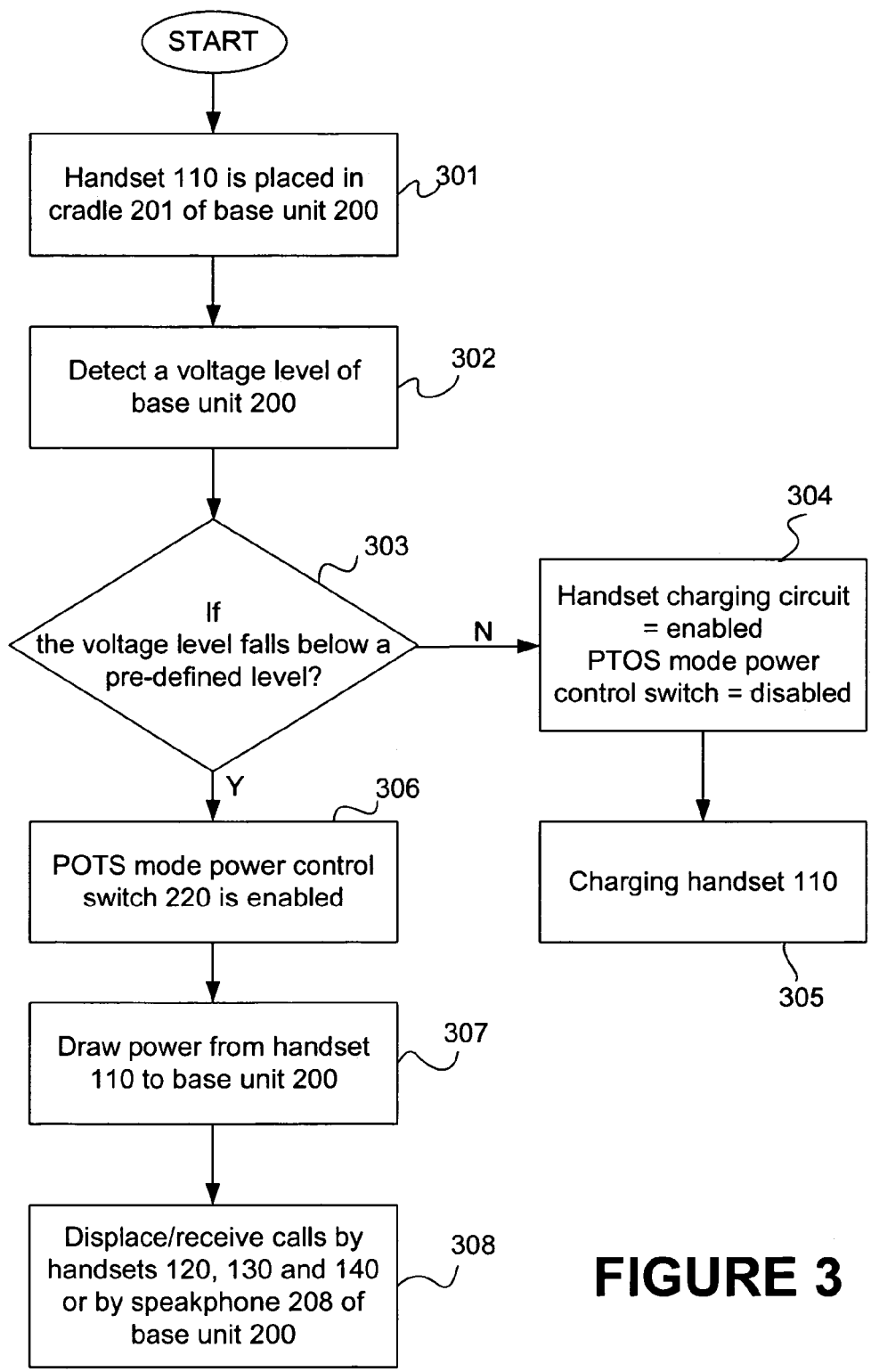
FIG. 3 is a flow chart showing a method for charging a base unit by a portable unit in an exemplary cordless telephone system during a power failure.

A method for providing power to base unit 200 from portable unit 110 while a power outage occurs in accordance with the present invention is shown in FIG. 3.

Step 301 shows that portable unit 110 is not being used and is placed within cradle 201 of base unit 200. At the time, as shown in FIG. 2, charging terminals 112, 114 come into contact with charge contacts 202, 204 to form an electrical circuit.

At steps 302 and 303, line status control circuit 230 detects a voltage level of base power supply 240 and determines if the voltage level falls below a pre-defined voltage level, which typically means a power outage has occurred at power line 260. If the voltage level does not fall below the pre-defined voltage level, the method continues to step 304. Otherwise, the process continues to step 306.

At step 304, if the voltage level maintains beyond the pre-define voltage level, portable unit charging circuit 210 is enabled and POTS mode power control switch 220 is turned open. Then at step 305, portable unit charging circuit 210 provides power from base power supply 240 to portable unit 110, thereby charging battery pack 115 of portable unit 110.

At step 306, if the voltage level falls below the pre-defined voltage level, portable unit charging circuit 210 is disenabled and POTS mode power control switch 220 is closed. As described above, disenabling portable unit charging circuit 210 can be done, for example, by setting charge lines 212, 214 to high impedances to prevent current from flowing through portable unit charging circuit 210. Therefore, at step 307, since portable unit charging circuit 210 is disenabled and POTS mode power control switch 220 is electrically connected with portable unit 110, POTS mode power control switch 220 begins to draw power from portable unit 110 to voltage regulators 250 via input 252.

In this manner, at step 308, as base unit 200 obtains appropriate power from portable unit 110, a user can use a second portable unit, e.g., portable unit 120, to place and receive calls as it does in a normal condition where a power outage is not occurred. Furthermore, in the case that cordless telephone system 100 includes more than two portable units, if battery 115 within portable unit 110 becomes depleted, portable unit 110 can be replaced by placing portable unit 120 (or portable units 130, 140, and so on) within the base unit cradle 201, such that further continued operation is available.

Additionally, the invention can be useful even where only a single portable unit is available and disposed within the base unit cradle. For example, if base unit 200 is equipped with a built-in speakerphone (such as speakerphone 208 of FIG. 1), calls can be conducted via conventional base unit speakerphone operations while the portable unit remains disposed within the cradle. Alternatively, some modern cordless telephone systems integrate speakerphone functionality into a cordless portable unit, such as speakerphone 116 of portable unit 140 shown in FIG. 1. In such a system, portable unit speakerphone 116 can be utilized for placement and receipt of telephone calls even while the portable unit remains disposed within the base unit cradle, providing power simultaneously to both the portable unit and base unit. Preferably, speakerphone 116 includes a microphone and a speaker. Therefore, even in single-portable unit telephone systems, a cordless telephone set still can remain operational in a power outage condition through use of speakerphone functionality.

Furthermore, in some circumstances, a cordless telephone base unit may provide a digital wireless communications gateway for accessories such as personal computer 150, via cordless telephony communication protocols or general purpose wireless standards such as BLUETOOTH or 802.11b. In such systems, the power control arrangement described herein can be employed to enable continued digital wireless communication functionality during power outage conditions.

Upon restoration of power to power line 260, line status control circuit 230 detects that the voltage level received from base unit power supply 240 exceeds a predetermined threshold, and control lines 231 and 232 transition to a logic high level. In response, mode power control circuit 220 switches to an open position, decoupling charge contacts 202, 204 from voltage regulator circuit 250. Meanwhile, voltage regulator circuit 250 receives power from base power supply 240 via input 251. Finally, portable unit charging circuit 210 responds to the control signal on line 231 by supplying power to charge contacts 202, 204 via lines 212 and 214.

Furthermore, to the extent that the base unit is equipped with a circuitry that prevents the handset battery from draining, this circuitry can be automatically disabled when the power failure condition occurs. Alternatively, this circuitry can be manually disabled by the user when the handset is placed by the user to supply power from the handset battery to the base unit.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What I claim is:

1. An electronic apparatus comprising:
   a portable unit having a battery pack and charge terminals, the charge terminals are electrically coupled to the battery pack; and
   a base unit comprising:
      a voltage status control circuit for detecting and determining a voltage level of a power supply of the base unit, wherein the voltage status control circuit comprises a first means for preventing power from flowing from the power supply of the base unit to the portable unit that is disposed within the cradle when the voltage level of the power supply of the base unit is lower than the predetermined level, and a second means for disabling the first means when the voltage level of the power supply of the base unit is higher than the predetermined level so that the power can flow from the base unit to the portable unit; and
      a cradle disposed within the base unit, the cradle is configured to receive the portable unit and has electrical contacts positioned for electrical coupling with the charge terminals of the portable unit when the portable unit is disposed within the cradle,
   wherein the base unit operates using power received from the battery pack of the portable unit when the voltage level of the base unit power supply is below a predetermined level.

2. The apparatus of claim 1, wherein the base unit and the portable unit are associated with a cordless telephone system, wherein the base unit is configured to place and receive telephone calls using the power received from the battery pack of the portable unit.

3. The apparatus of claim 1, wherein the battery pack of the portable unit is a rechargeable battery pack.

4. The apparatus of claim 1, wherein the battery pack of the portable unit can be recharged by the external source of power when the portable unit is placed in the cradle of the base unit.

5. The apparatus of claim 1, further comprising a second portable unit configured to communicate with the base unit, wherein the second portable unit comprises a battery pack and can be used to place and receive telephone calls via the base unit when the base unit uses the power received from the battery pack of a first portable unit.

6. The apparatus of claim 5, wherein the base unit operates using power supplied from the battery pack of the second portable unit when an external source of power to the base unit fails.

7. The apparatus of claim 6, wherein the battery pack of the second portable unit is recharged by the external source of power when the second portable unit is placed in the cradle of the base unit.

8. The apparatus of claim 1, wherein the base unit further comprises:
   a portable unit charging circuit responsive to an output of the voltage status control circuit to provide electrical energy to the electrical contacts when the voltage level exceeds the predetermined level; and
   a power control circuit responsive to an output of the voltage status control circuit to couple the electrical contacts to an input of a voltage regulator circuit when the voltage level falls below the predetermined level.

9. The apparatus of claim 8, wherein the power control circuit comprises an electronic switch configured to alternatively couple or decouple the voltage regulator circuit with the electrical contacts depending upon a state of the voltage status control circuit output.

10. The apparatus of claim 1, wherein the first and second means of the voltage status control circuit are operated manually.

11. A method for powering a base unit of an electronic apparatus comprising:
    detecting by the base unit that a power outage condition has occurred;
    placing a portable unit of the electronic apparatus into a cradle of the base unit;
    receiving power by the base unit from a battery pack of the portable unit;
    preventing power from flowing from a power supply of the base unit to the portable unit during the time when the power outage condition occurs, and
    supplying the power from the power supply of the base unit to the portable unit when detecting that the power outage condition is no longer occurred.

12. The method of claim 11, further comprising:
    comparing a voltage level of an external power line to a predetermined voltage level; and
    receiving power by the base unit from the battery pack of the portable unit when the voltage level of the external power line has fallen below the predetermined voltage level.

13. The method of claim 11, wherein the base unit is configured to place and receive telephone calls.

14. The method of claim 11, wherein the base unit is configured to place and receive telephone calls using the power received from the battery pack of the portable unit.

15. The method of claim 11, wherein the electronic apparatus includes a second portable unit, wherein the second portable unit is configured to place and receive telephone calls via the base unit when the base unit is powered by the battery pack of the first portable unit.

16. The method of claim 11, wherein the battery pack of the portable unit is a rechargeable battery pack.

17. The method of claim 16, wherein the battery pack of the portable unit can be recharged by the external source of power when the portable unit is placed in the cradle of the base unit.

18. The method of claim 11, wherein the steps of preventing power from flowing to the portable unit and supplying power to the portable unit are operated manually.

19. A cordless telephone system for continued operation of a base unit during a power outage condition, the system comprising:
    a first cordless telephone portable unit, including a rechargeable battery pack, and charge terminals that are electrically coupled to the rechargeable battery pack;
    a base unit capable of communicating with the first cordless portable unit to place and receive telephone calls, the base unit comprising:
       a cradle that is configured to receive the first cordless portable unit, the cradle comprising electrical contacts for electrical coupling with the portable unit charge terminals when the portable unit is disposed within the cradle;
       a power supply for receiving electrical power from an external power source;
       a line status control circuit coupled to the base unit power supply which outputs a signal indicative of whether the voltage present on the power line exceeds a predefined level;

a portable unit charging circuit responsive to an output of the line status control circuit to provide electrical energy to the electrical contacts when the voltage present on the power line exceeds a predefined level;

a power control circuit responsive to an output of the line status control circuit to couple the electrical contacts to an input of a voltage regulator circuit when the voltage present on the power line falls below a predefined level; and means for preventing power from flowing from the power supply of the base unit to the portable unit that is disposed within the cradle when the voltage level of the power supply of the base unit is lower than the predetermined level, and for allowing the power flowing from the power supply of the base unit to the portable unit when the voltage level of the power supply of the base unit is higher than the predetermined level, wherein the base unit operates using power supplied by the first portable unit rechargeable battery pack when the external source of power to the power line fails.

20. The system of claim 19, further comprising a second portable unit capable of communicating with the base unit, wherein the second portable unit can be used to place and receive telephone calls via the base unit when the external source of power to the power line fails.

21. The system of claim 19, wherein the first portable unit further comprises a speakerphone, whereby the first portable unit can be used to place and receive telephone calls via the base unit using the speakerphone when the supply of power to the power line fails.

22. The system of claim 19, wherein the base unit further comprises a speakerphone, wherein the base unit speakerphone can be used to place and receive telephone calls when the supply of power to the power line fails.

23. The system of claim 19, wherein the voltage regulator circuit having at least one input for receipt of electrical power and having at least one output providing regulated power to circuitry within the base unit.

24. The system of claim 23, wherein the power control circuit comprises an electronic switch configured to alternatively couple or decouple the voltage regulator circuit with the electrical contacts depending upon the state of the line status control circuit output.

25. The system of claim 19, wherein the means for preventing is operated manually.

* * * * *